Patented June 19, 1928.

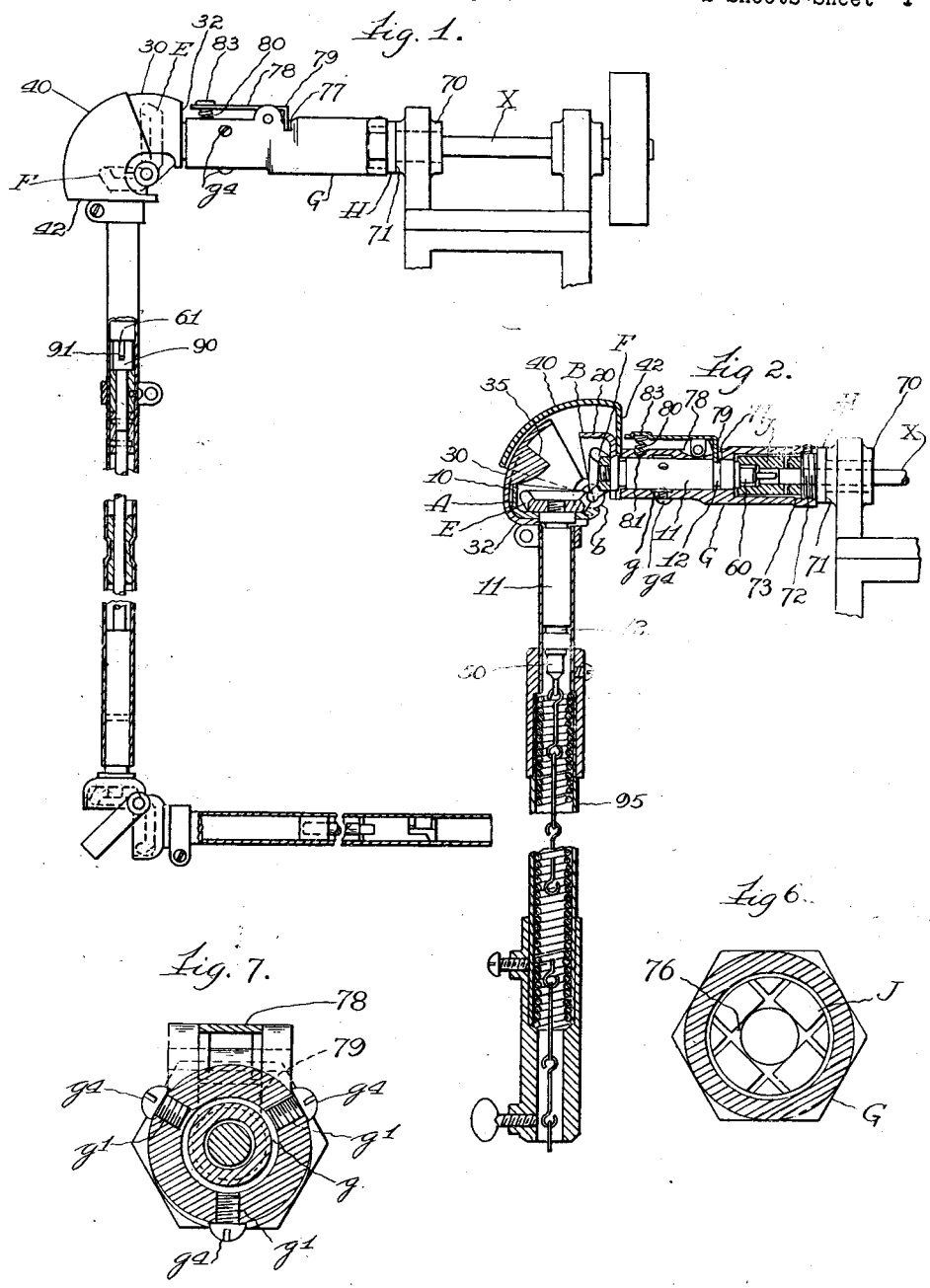

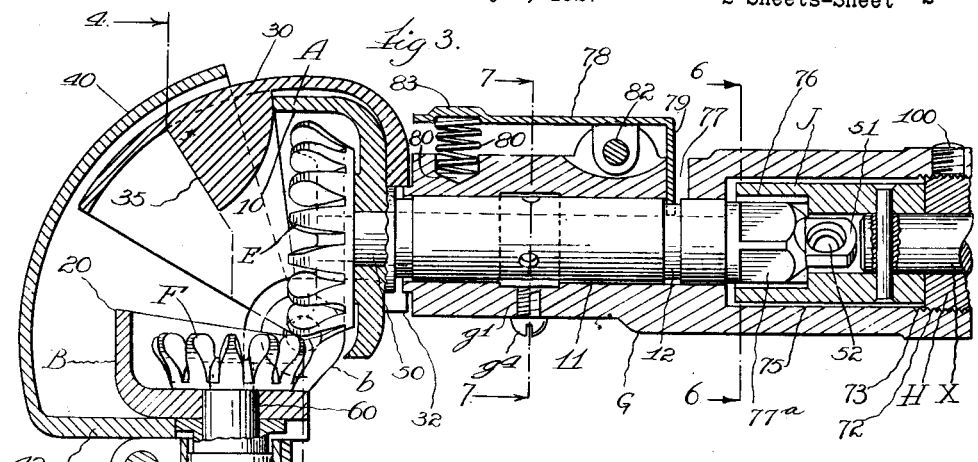

1,674,400

UNITED STATES PATENT OFFICE.

HENRY KOCOUREK, OF CHICAGO, ILLINOIS, ASSIGNOR TO CHICAGO FLEXIBLE SHAFT COMPANY, OF CHICAGO, ILLINOIS, A CORPORATION OF ILLINOIS.

POWER-SHAFT COUPLING WITH HAND-DIRECTED TOOL.

Application filed May 7, 1927. Serial No. 189,520.

The purpose of this invention is to provide a coupling from a power shaft to a hand drive tool, such as a sheep shear or horse clipper, particularly adapted to communicate to the tool either higher or lower rotative speed than that of the power shaft and also particularly adapted to be coupled alternatively for increased or decreased speed as desired and as suitable for the work being done. The invention is shown applied to an apparatus arranged for both sheep shearing and horse clipping to which uses it is particularly applicable as may be understood upon considering that the speed suitable for the sheep shear being as high as 2600 R. P. M. is useless, and under some circumstances a dangerous speed for a horse clipper, for which the speed should not exceed 1200 R. P. M., which would be ineffectual speed for a sheep shear. The invention consists of the elements and features of construction for the purpose specified, as shown and described as indicated in the claims.

In the drawings:—

Figure 1 is a partly sectional elevation of an equipment comprising coupling means for a power shaft to a manually directed sheep shear in which the coupling means is constructed to embody this invention.

Figure 2 is a view similar to Figure 1 but wholly sectional and showing the coupling reversed and the free end coupled to a flexible shaft of the character commonly employed for driving a horse clipper.

Figure 3 is a view similar to Figure 2, but of full size showing the coupling the reverse of Figure 2, that is, as in Figure 1.

Figure 4 is a detail section at the line 4—4 on Figure 3.

Figure 5 is a partly sectional side elevation of the upper horizontal part of the structure shown in Figure 4 on a reduced scale, and showing the journal bearing bracket from which the power shaft protrudes for receiving the coupling.

Figure 6 is a section at the line 6—6 on Figure 3.

Figure 7 is a section at the line 7—7 on Figure 3.

The part referred to as the bevel gear couple hinge element should be first described. This term is employed to designate the two journal-bearing members which are hingedly connected, including the shafts journalled in them respectively, and the bevel gears on the respective shafts intermeshing with their pitch lines intersecting at the pivotal axis of the hinge connections of the two journal bearing members. This gear couple hinge device, therefore, comprises journal bearing members, A and B, having co-operating lugs, a—a and b—b, adapted for interlocking for pivoting the two journal bearing members, A and B, together in a manner well understood and which will not be further described. This bevel gear couple hinge member comprises also, as stated, a larger and a smaller bevel gear, E and F, respectively and their respective shafts, 50 and 60, journalled in the identically formed and dimensioned journal bearing extensions, 11—11, respectively of the members A and B. To protect the gears E and F against accidental engagement between them of extraneous material which would cause injury or impediment, the journal bearing hinge members A and B are furnished with housings, 30 and 40, respectively, sectoral in form dimensioned relatively for telescoping one within the other in the hinge movement of the journal bearings. These housings are mounted by their radial walls, 32 and 42, on the backsides of the journal members. The journal bearings, A and B, having the flanges, 10 and 20, continuous with the lugs by which they are pivoted together for their hinge movement extended about three-quarters of the way around the respective gears for guarding throughout their unmeshed angular extent; and to prevent them from being folded together so as to be intermeshed to a greater angular extent than that for which they are adapted in accordance with their differing diameters, the interiorly telescoped housing 30 is provided with an interiorly projecting lug, 35, positioned and dimensioned for encountering the flange, 20, of the journal bearing, A, at the limit of the permissible folding together of the two parts A and B.

It will be observed that the two journal bearing extensions, 11—11, are identical in form and dimensions, and thereby they are both equally adapted to co-operate with any suitable coupling for connecting the device to the journal bearing of a power shaft, and to the journal bearing of the work shaft or driven shaft, that is, the shaft through which the manually directed tool is to be actuated from the power shaft by means of the coupling structure, such last mentioned journal bearing being usual the initial element of the housing or casing of a flexible shaft which extends to the manually directed tool for operating the same; and carrying out the same idea and purpose of adapting the coupling hinge to be connected either way, that is, for increasing or decreasing speed, each of said journal bearings, 11—11, has an annular groove 12, for engaging a spring catch with which the coupling sleeve of the power shaft bearing is furnished as will be hereinafter described, for retaining the bevel gear hinge coupling in connection with the power shaft and its bearing, as stated, regardless of which of the journal bearing extensions of said gear hinge coupling is coupled to the power shaft bearing, that is, whether the device is coupled for transmitting reduced speed or for transmitting increased speed from the power shaft to the tool.

Referring now to Figure 4: To constitute a terminal for the journal bearing of the power shaft, X, adapted to receive and retain either end of the bevel gear couple hinge device, there is provided a coupling member which comprises a bushing, H, and a coupling sleeve, G, screwed together. The bushing, H, is diametered for drive fit in the bearing, 70, of the power shaft, X, and terminates in an enlargement forming a shoulder, 71, which is stopped against the bearing, 70. Said enlargement is reduced and exteriorly threaded as seen at 72 for receiving the interior end, 73, of the coupling sleeve, G. Said sleeve, G, is axially bored to fit equally either of the journal bearing extensions, 11—11, and is counter bored as seen at 75 for interiorly threading at 73 as mentioned. The counter-bore, 75, is diametered to accommodate a chuck, J, which is pinned fast to the end of the power shaft, X, and formed with a square socket, 76, for driving engagement with the squared end portion, 77ª, of either of the shafts 50 and 60 of the gears E and F, respectively. The sleeve, G, near the inner end of the journal bearing that is, at a short distance from the end of the counter-bore, 75, in position to register with the annular groove, 12, in either of the journal bearing extensions, 11—11, when the same is entered in the journal bearing has a transverse slot, 77; and on the outside of the sleeve there is pivotally mounted a spring catch, 78, having an inturned catch nose, 79, which protrudes in the slot, 77, a spring, 80, being seated in a socket, 81, under the end of the catch opposite the catch nose reacting on the catch for holding the nose normally protruded in the slot, 77, and swung against and stopped at the side of the slot toward the catch pivot, 79. The end of the catch under which the spring is positioned is formed with a slight outstruck boss, 83, forming at the under side a slight socket for seating and retaining the end of the spring, while the boss affords area for manual operation of the catch to release the nose from the groove, 12, of the journal bearing terminal, 11.

The work shafts of the different manually directed tools which are alternatively to be driven by the coupling structure above described, are differently constructed as to the features for engagement by the shaft of the driving gear of the bevel gear hinge couple, which it will be understood may be either of the shafts 50 and 60 according to whether the device is interposed for increased or for decreased speed. The sheep shear which is to be driven at the higher speed and which for that purpose is coupled to the shaft, 60, of the smaller gear, F,—the shaft, 50, being in that case coupled to the power shaft,— has its initial element, seen at 90 in Figure 3, provided at the end which is to be coupled to the shaft, 50, formed forked or split producing in the end a notch or recess, 91, which is dimensioned for receiving and fitting the flat terminal, 61, of the shaft, 60, but too narrow to admit the similar but thicker flat terminal, 51, of the shaft, 50; so that when the apparatus is to be put in service for driving a sheep shear, if the gear hinge coupling device has by mistake been coupled to the power shaft by the end in which the shaft, 60, is journalled, leaving the shaft, 50, exposed for coupling to the work shaft, that coupling cannot be made, and the operator will thereby be advised of the error in the couplings to the power shaft. For like purpose the initial element of the inleading shaft. 95, of the horse clipper is a chain of which a terminal link is adapted to be hooked through an eye, 52, formed in the flat terminal 51 of the shaft, 50; and the flat terminal, 61, of the shaft, 60; has no such eye or other means of engagement by the chain link; so that when the apparatus is to be put in service for operating the horse clipper, if by any mistake the bevel gear hinge couple has been coupled to the power shaft by the end having the shaft 50, leaving the shaft, 60, exposed for coupling to the work shaft, the coupling to the horse clipper cannot be made, and the operator will thereby be advised of the error in the coupling made to the power shaft.

It will be understood from Figure 1 that in the usual assemblage of apparatus for the purpose indicated, the power shaft is journalled at an elevated position on a supporting frame-work and that the coupling sleeve member shown constituting a protruding journal bearing for the power shaft becomes a support from which the remainder of the coupling structure is suspended. These circumstances determine certain detail features of the construction requiring specific mention. The bevel gear hinge couple device and the flexible shaft connected to the driven shaft thereof and extending down and off to a considerable distance to the manually directed tool, such as a sheep shear or horse clipper which is to be operated, constitutes a very considerable weight which must be safely supported by the means provided for the engagement of the bevel gear couple hinge element with the protruding power shaft bearing element consisting of the sleeve G. The connection which must be competent to resist all normal pull, whether due to the weight of the connected structure or to the manipulation of the manually directed tool, it will be observed consists of the spring catch, 78, whose nose, 79, engages the annular groove, 12, in the journal bearing extension, 11, which is fitted into and engaged by the catch with the sleeve, G. Said journal bearing extensions having the gear shaft, 50, or 60, extending through it and journalled in it, is of necessarily quite limited diameter and thickness and the groove, 12, is therefore necessarily shallow and in order that the catch nose may obtain any sufficient area of engagement for safely holding the parts in connection, it is dimensioned at the end which engages the slot for spanning substantially the full diameter of the journal bearing extension, 11, and is made concavely arcuate at its end for extending around said journal bearing extension so as to present for engagement with the side of the slot the maximum possible area.

In view of the importance of securing the sleeve, G, against any possibility of unscrewing from the bushing, H, a set screw, 100, is provided in the sleeve for setting upon the thread of the bushing when the sleeve has been screwed up as tightly as possible against the shoulder back of said thread. Since it is impossible to cut the threads with such uniformity as to ensure the parts coming tight always at the same position, that is, so that the same side of the sleeve will be uppermost, provision is made for the sleeve to retain lubricant in the space provided in the usual manner (by a counterboring intermediate the ends, as seen at $g$.) by providing at least three oil holes, $g^1$, $g^1$, $g^1$, one hundred and twenty degrees (120°) apart around the sleeve, one of which will be found in the upper 120 degrees of the sleeve at any position at which the sleeve may come tight in screwing it onto the bushing, H. Screws, $g^4$, are provided for closing the two oil holes which are at the lower side from which lubricant might be wasted.

It may be understood that the particular occasion for this invention in respect to the means which it provides for deriving either higher or lower speed from a power shaft, arises from the fact that installations for such purposes,—sheep shearing or horse clipping,—commonly comprise a motor, as an electrical motor, constructed for most economical power output at a certain predetermined speed, the driving apparatus of the connection being made directly to the motor shaft without antecedent or intervening speed-changing connections.

I claim:

1. A device for the purpose indicated comprising journal bearing members having unequal bevel gears journalled in them respectively, said members being pivoted together at an axis tangential to the pitch circles of the gears, said members having identically formed protruding journal bearings for the shafts of said gears respectively, whereby they are adapted to be mounted for coupling of either one of the shafts to a power shaft; whereby said device serves for transmitting rotary movement from a power shaft either at reduced or increased speed relative to that of the power shaft.

2. A device for the purpose indicated comprising journal bearing members furnished with sectoral housings and pivoted together at the center in common of said housings, and unequal intermeshing bevel gears journalled in and having their shafts protruding from the members respectively, said shafts and journal bearings being similarly dimensioned for being alternatively coupled to a power shaft and its bearing; whereby said device serves for transmitting rotary movement either to reduce or increase the speed of the power shaft according to which member is coupled to the power shaft at its bearing.

3. In the construction defined in claim 2, the bevel gear shafts being formed at their protruding ends similarly as to means of coupling to a driving shaft and differently as to means of coupling to a shaft to be driven.

4. A power transmitting coupling for the purpose indicated comprising a bevel gear couple hinge consisting of bevel gear bearing means in which they are respectively journalled for intermeshing at their pitch circles, such pitch circles intersecting at the pivot axis; said journal bearings having similarly dimensioned cylindrical extensions; a journal bearing sleeve adapted to receive either of said journal bearing extensions, said extensions having each an annular groove and the sleeve having a transverse segmental slot positioned for registering with said groove when the journal bearing is entered into the sleeve, and a manually operated spring catch mounted on the sleeve having a catch nose extending through said slot for engaging said groove.

5. In the construction defined in claim 4, the catch nose being substantially as wide at the end engaging the groove as the reduced diameter of the journal bearing and being concavely arcuate at the end to fit the bottom of the groove.

In testimony whereof, I have hereunto set my hand at Chicago, Illinois, this 3rd day of May, 1927.

HENRY KOCOUREK.